Oct. 28, 1958

D. R. DEWEY II 2,858,442

APPARATUS FOR INCREASING THE UNIFORMITY
OF DOSE DISTRIBUTION PRODUCED BY
ELECTRON IRRADIATION

Filed March 18, 1954

INVENTOR Davis R. Dewey II
BY H.C. Nields ATT'Y

Oct. 28, 1958 D. R. DEWEY II 2,858,442
APPARATUS FOR INCREASING THE UNIFORMITY
OF DOSE DISTRIBUTION PRODUCED BY
ELECTRON IRRADIATION
Filed March 18, 1954 5 Sheets-Sheet 4
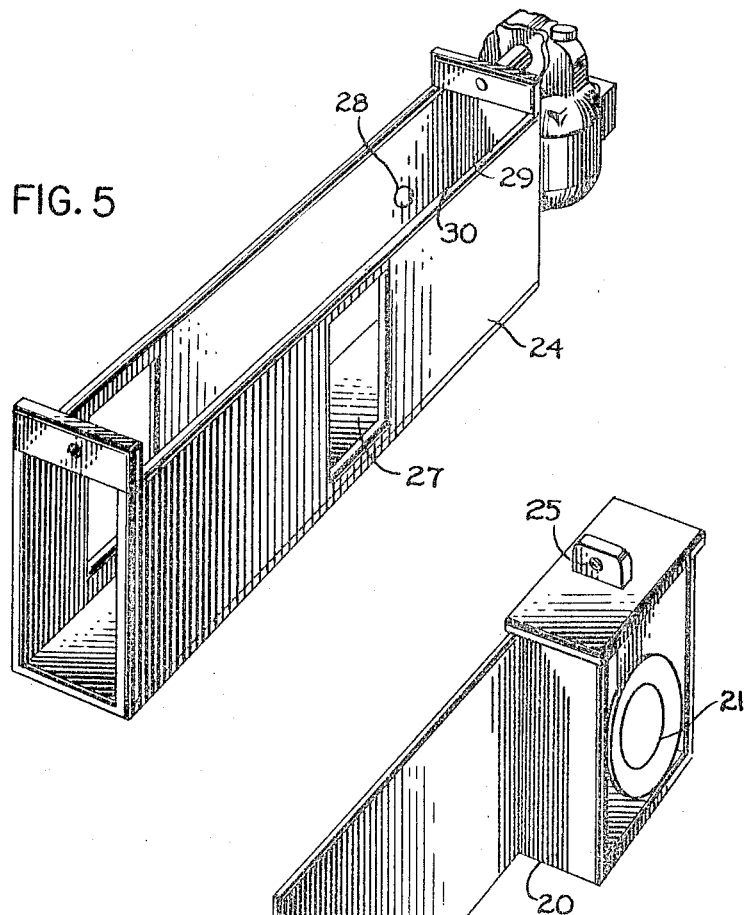
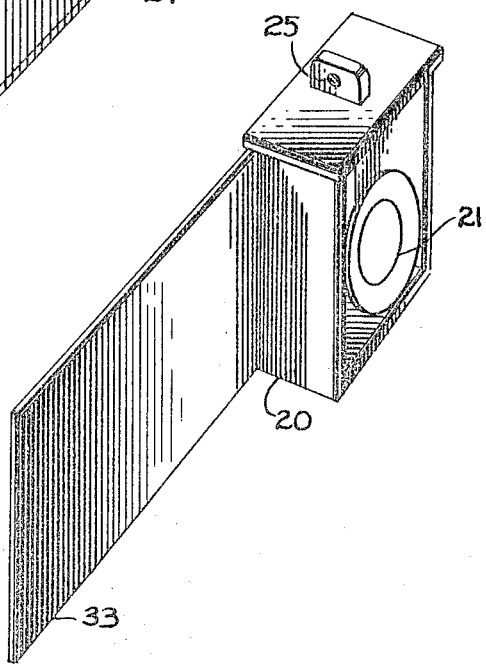
INVENTOR *Davis R. Dewey II*
BY *H.C. Nields* ATT'Y Oct. 28, 1958 D. R. DEWEY II 2,858,442
APPARATUS FOR INCREASING THE UNIFORMITY
OF DOSE DISTRIBUTION PRODUCED BY
ELECTRON IRRADIATION
Filed March 18, 1954 5 Sheets-Sheet 5

INVENTOR Davis R. Dewey II
BY H. C. Nields ATT'Y

United States Patent Office 2,858,442
Patented Oct. 28, 1958

2,858,442

APPARATUS FOR INCREASING THE UNIFORMITY OF DOSE DISTRIBUTION PRODUCED BY ELECTRON IRRADIATION

Davis R. Dewey II, Lincoln, Mass., assignor to High Voltage Engineering Corporation, Cambridge, Mass., a corporation of Massachusetts Application March 18, 1954, Serial No. 417,098

11 Claims. (Cl. 250—49.5)

This invention relates to the irradiation of matter with high energy electrons, and in particular to a method of and apparatus for increasing the uniformity of dose distribution produced by irradiation with high energy electrons in products which are divisible into thin layers, such as products in sheet, filamentary, or fluid form.

High energy electron sources are becoming increasingly available, and the irradiation of various products with high energy electrons for the purposes of sterilization, preservation, and catalyzation of chemical changes are being widely explored. The use of high energy electrons for such purposes has been known for some time, and numerous examples of products which may appropriately be subjected to electron bombardment are to be found in the prior art. For example, a variety of uses for electron irradiation are set forth in British Patent No. 299,735 (1928). Other examples include the production of vitamin D (U. S. Patent No. 2,007,765); and the vulcanization of rubber (U. S. Patent No. 1,906,402). Radiation-induced cross-linking of polyethylene and other substances in a similar manner has been accomplished. A comprehensive report on the subjection of numerous plastics to ionizing radiation has been published by the U. S. Atomic Energy Commission (ORNL–928, June 29, 1951).

Generally it is desirable that the dose received by a product in electron irradiation be substantially uniform throughout the volume of such product. This requirement is dictated in part by considerations of efficiency. To obtain the desired effect throughout the product, it is usually necessary that at least a minimum dose be received at all points in the product. This means that, unless the dose distribution throughout the volume of the product is substantially uniform, some portions of the product must receive more than the minimum dose, with resultant loss in efficiency. Moreover, undesirable side effects are frequently enhanced when parts of the product are thus overdosed.

A major cause of non-uniformity of dose distribution is the fact that any point in the product in the path of the high energy electrons absorbs energy from the electron stream at a rate which varies depending upon the normalized product thickness intervening between such point and the electron source. By "normalized product thickness" is meant a quantity which is proportional to linear product thickness multiplied by the density of the product. In general, points which are separated from the electron source by a certain optimum intervening normalized product thickness absorb ionizing energy from the electron stream at a maximum rate. The rate of absorption becomes continuously less as the intervening normalized product thickness deviates from this optimum value in either direction. For example, in the case of monoenergetic electron beams, the rate of absorption falls to about 60% of the maximum at the incident surface of the product, and falls to a negligible value for an intervening normalized product thickness of approximately three times the optimum intervening normalized product thickness; and other non-uniform relations obtain with mixed-energy beams.

By the method of my invention, I am able to overcome this non-uniformity of dose distribution in the case of products which are divisible into thin layers. Of course, non-uniformity of dose distribution may be overcome, in the case of such products, merely by conveying through the electron stream only a single thin layer at a time. The resultant dose distribution through the thickness of the layer will then be substantially uniform, owing simply to the fact that the thickness is very small. However, such a method of irradiation would be so inefficient as to be impractical, since only a tiny fraction of the power in the electron beam would be utilized. Considerations of efficiency thus demand that a plurality of layers be irradiated simultaneously; and, owing to the phenomenon described in the preceding paragraph, the dose distribution among the various layers tends to be non-uniform. It is this non-uniformity among layers irradiated simultaneously which it is the purpose of my invention to correct. Briefly stated, the method of my invention comprises conveying such a product through a stream of high energy electrons in such a manner that, during the irradiation of any point in such product, the normalized product thickness intervening between such point and the electron source assumes a sequence of values which sequence is substantially the same for all points in the product.

In the drawings:

Fig. 5 is a perspective view of a part of the apparatus of Fig. 4;

Fig. 6 is a perspective view of another part of the apparatus of Fig. 4;

Figure 1:
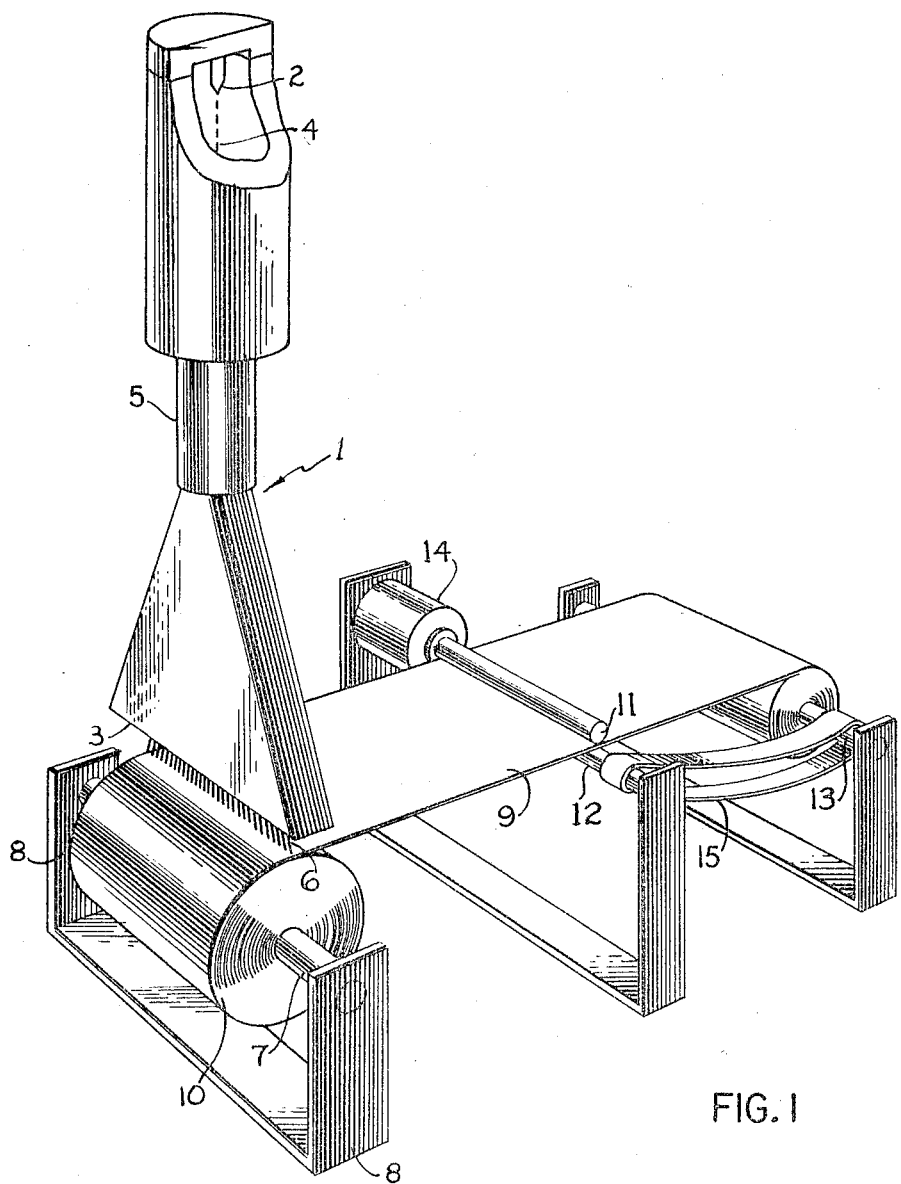
Fig. 1 is a perspective view of one embodiment of apparatus for practicing the method of my invention in the irradiation of a continuous length of flexible sheet material, wherein such flexible sheet material is irradiated by high energy electrons while in the form of a roll.

Referring to the drawings, and first to Fig. 1 thereof, an evacuated acceleration tube which provides a continuous stream of electrons is indicated at 1. Electrons emitted at a cathode 2 are accelerated down the tube in a conventional manner and issue therefrom at high energy through a narrow, elongated electron window 3 which comprises a thin strip of aluminum foil. Preferably the electrons are accelerated in the form of a beam 4 of small cross-sectional diameter; and, after the electrons have attained full velocity, a rapid scanning movement is imparted to the electron beam by a scanning-coil assembly 5 in a manner which is fully disclosed in U. S. Patent No. 2,602,751 to Robinson (assigned to the assignee of the present invention), so that the electrons issue through the electron window 3 in the form of a thin sheet, as indicated at 6 in Fig. 1.

A spindle 7 is rotatably supported below the electron window 3 and in alignment therewith by suitable brackets 8. A length of flexible sheet material 9 to be irradiated (such as, for example, polyethylene film in which it is desired to induce cross-linking by electron irradiation) is wound on the spindle 7 so as to form a roll 10, and the leading edge of the flexible sheet material 9 is passed between rollers 11, 12 and affixed to a take-up spindle 13. During irradiation a motor 14 rotates the upper roller 11, so that the flexible sheet material 9 is unwound from the roll 10. A belt 15 which passes around the idler roller 12 and the take-up spindle 13 rotates the latter, there being sufficient slack in the belt 15 so that the take-up spindle 13 rotates only fast enough to take up the flexible sheet material 9 as it is fed by the drive roller 11.

The electrons will penetrate the roll of flexible sheet material to a maximum penetration $p$ which is nearly proportional to the energy of the electrons divided by the density of the material irradiated. For example, if a roll of flexible sheet material of .006-inch thickness and of density equal to that of water is irradiated with 2-m. e. v. electrons, $p$, would be about one-quarter inch, and so the electrons would penetrate through about 40 layers of such material.

As the flexible sheet material is unwound from the roll, each point thereof which when irradiation commenced was a distance below the surface of the roll greater than $p$ will pass through the electron stream $p/d$ times, where $d$ is the thickness of the flexible sheet material. Each such point receives no appreciable dose until the total thickness of flexible sheet material between it and the electron source is less than $p$. With each revolution of the roll the total thickness of flexible sheet material between each such point and the electron source is reduced by the amount $d$, until the point is at the outer circumference of the roll.

If $p$ is several times greater than $d$, the total dose received by each such point will not be affected by the variation, with depth, of the rate at which ionizing energy is absorbed from the electron stream.

Although in the embodiment of apparatus shown in Fig. 1 the flexible sheet material 9 is unwound from a roll 10 which is positioned in the path of the electron stream 6, it is obvious that the same results may be achieved by winding flexible sheet material onto a roll which is positioned in the path of the electron stream. Thus, for example, the acceleration tube 1 of Fig. 1 may be positioned over the take-up spindle 13, so that the flexible sheet material 9 is irradiated as it accumulates on the take-up spindle 13.

Figure 2:
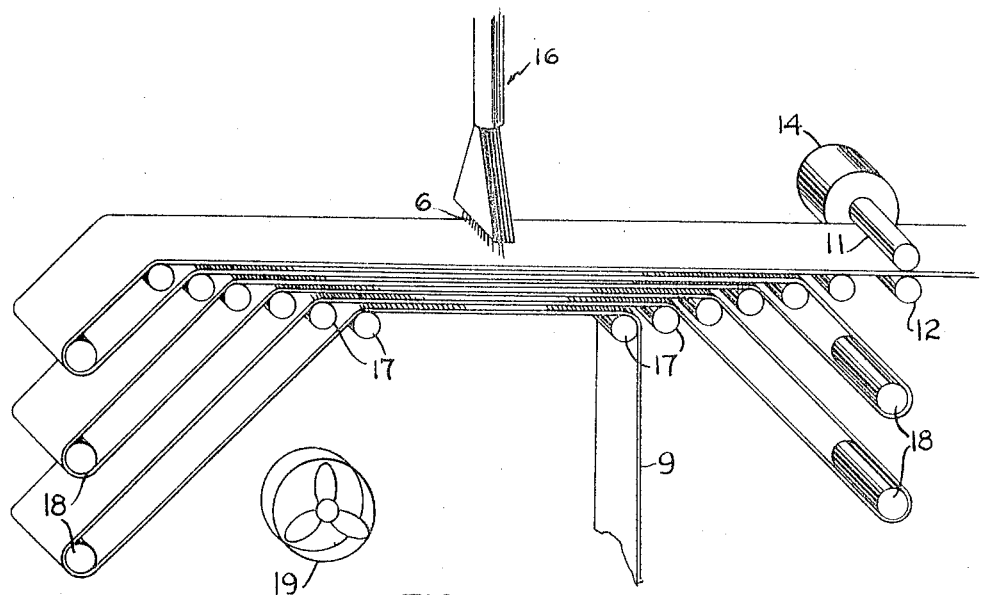
Fig. 2 is a perspective view of another embodiment of apparatus for practicing the method of my invention in the irradiation of a continuous length of flexible sheet material, wherein such flexible sheet material is conveyed through a stream of high energy electrons by means of an array of pulleys.

Another embodiment of apparatus for practicing the method of my invention in the irradiation of flexible sheet material is shown in Fig. 2, wherein an electron source similar to that of Fig. 1 is indicated at 16. Flexible sheet material 9 to be irradiated is drawn through an array of pulleys 17, 18 by the rollers 11, 12, of which the upper roller 11 is rotated by a motor 14. Since the thickness of the flexible sheet material 9 will generally be much less than the diameter of the pulleys 17, 18, the pulleys 17 may be arranged in V-formation as shown in Fig. 2, in order that the several layers of flexible sheet material in the path of the electron stream 6 may be closely adjacent as they pass through the electron stream 6, thereby to minimize scattering of the electron stream in the intervening layers of air. Preferably the number of layers in the path of the electron stream is on the order of $p/d$. Each point in the flexible sheet material 9 thus passes through the electron stream 6 approximately $p/d$ times, but the intervening thickness of flexible sheet material varies successively each time by an amount $d$ between zero and $p$. Consequently, the total dose received by each such point will not be affected by the variation, with depth, of the rate at which ionizing energy is absorbed from the electron stream.

Although at usual doses the heat generated in a product by electron irradiation is on the order of only a few degrees centigrade, in some cases it may be desirable to minimize the temperature rise produced in the product by the electron stream. For example, it may be desirable to irradiate polyethylene film close to its melting point, in which case only a slight temperature rise could be tolerated. In such cases, the flexible sheet material may be cooled between passages through the electron stream by having it travel through a second array of pulleys 18 which are spaced apart in order that the flexible sheet material may be cooled, for example, by circulation of air assisted by fans, one of which is indicated diagrammatically at 19.

Figure 3:
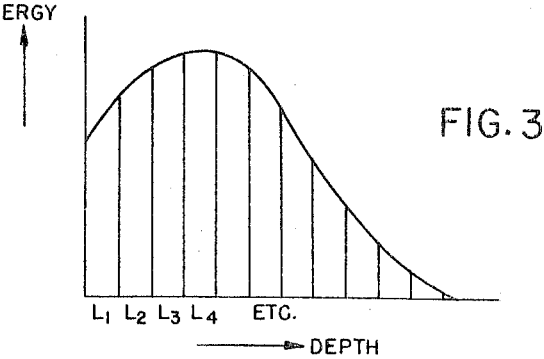
Fig. 3 is a graph illustrating the distribution in depth of the rate of absorption of ionizing energy from a stream of high energy electrons.

In each of the embodiments of apparatus shown in Figs. 1 and 2 the product mass in the path of the electron stream is divisible into a plurality of closely-packed layers lying transversely in the path of the electron stream. In the graph of Fig. 3, the relative rate of absorption of ionizing energy from the electron stream is plotted as a function of depth in the product mass. The various layers are indicated at $L_1$, $L_2$, $L_3$, etc. Each point in the product will successively pass through the electron stream at each position in the sequence of layers, and the incremental dose received at each such position will be proportional to the rate of absorption at that position. Although the rate of absorption varies greatly over the whole product mass in the path of the electron stream, the variation over each layer is negligible. Since each point in the product is irradiated successively at each position in the sequence of layers, the total dose tends to be uniform for all points in the product.

Figure 4:
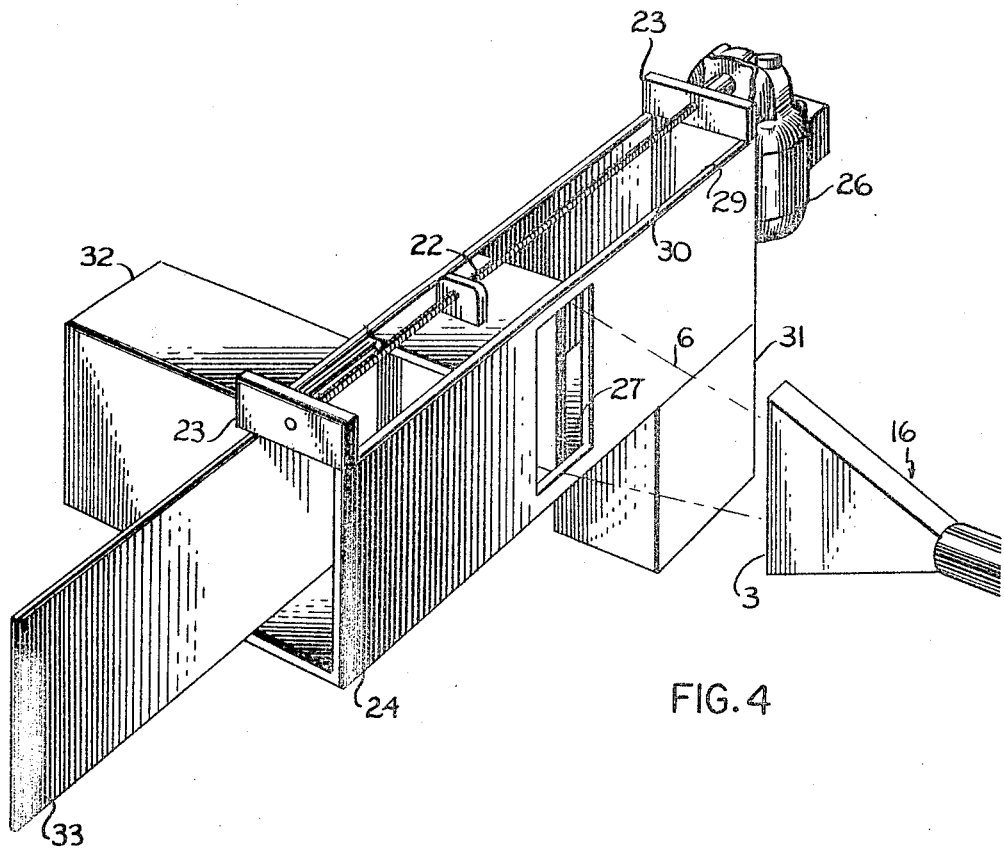
Fig. 4 is a perspective view of one embodiment of apparatus for practicing the method of my invention in the irradiation of a multiplicity of thin sheets.

A multiplicity of thin products may be irradiated in accordance with my invention by arranging a plurality of such products in a stack whose thickness is not less than on the order of the maximum penetration of the electron stream with which such products are to be irradiated, directing such electron stream onto said stack in such a manner that the electrons in said stream penetrate through several layers of the stack so as to irradiate the same, and, during such irradiation, removing one or more layers of small total thickness from (or adding one or more layers of small total thickness to) that extremity of said stack upon which said electrons impinge. For example, dishes, plates, spoons, forks, and similar articles which are composed of normally thermoplastic material such as polyethylene may be irradiated in this manner for the purpose of inducing cross-linking therein so as to impart thermosetting properties to such material. Figs. 4, 5 and 6 illustrate one embodiment of apparatus for irradiating, in accordance with my invention, a multiplicity of thin products, such as polyethylene plates.

Referring to Figs. 4, 5 and 6 a rectangular enclosure 20, adapted to hold a plurality of thin products, such as plates, one of which is shown at 21 in Fig. 6 (or any other thin product to be irradiated), whose total thickness is not less than on the order of the maximum penetration of the electron stream employed, is suspended from a support rod 22 which is journaled in suitable brackets 23 attached to an elongated frame 24 within which said enclosure 20 may slide. The support rod 22 is threaded so as to engage a threaded aperture 25 at the top of the enclosure 20. Rotation of the support rod 22 by means of a gear motor 26 imparts a sliding movement to the enclosure 20 within the frame 24. Microswitches or other suitable means (not shown) reverse the direction of rotation when the enclosure 20 reaches either extremity of the frame 24, so that the enclosure 20 moves continuously back and forth along the length of the frame 24.

An aperture 27 in one side of the frame 24 is aligned with the cathode-ray window 3 of an electron accelerator 16; and, as the enclosure 20 passes by the aperture 27, the plates 21 (or other product) are irradiated by the electron stream 6. When the enclosure 20 reaches the far end of the frame 24 (i. e. that extremity of the frame 24 which is nearer the gear motor 26), a spring-loaded ball 28 (shown in Fig. 5) forces the stack of plates 21 into a recess 29; and as the enclosure 20 returns in the forward direction (i. e. away from the gear motor 26), a lip 30 at the edge of the recess 29 catches one or more plates 21 of small total thickness, which thereupon fall into a receptacle 31.

When the enclosure 20 reaches the near end of the frame 24 (i. e. that extremity of the frame 24 which is the more remote from the gear motor 26), additional plates 21 from a supply chamber 32 are forced into the enclosure 20 at that end of the stack which is opposite to that from which the plates 21 were removed by the lip 30. As the enclosure 20 returns in the backward direction (i. e. towards the gear motor 26), an extension 33 on the enclosure 20 holds the remaining plates 21 in the supply chamber 32 in place.

Figure 7:
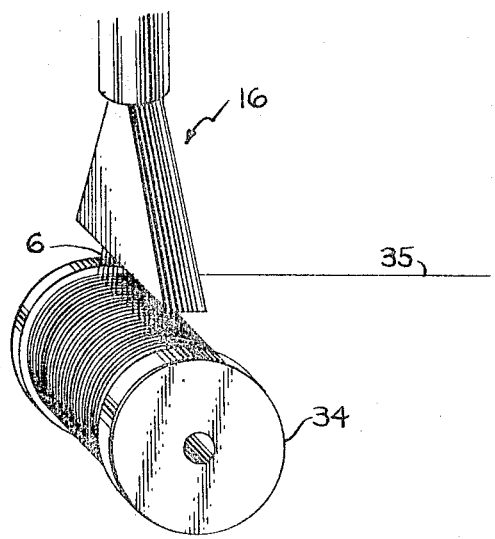
Fig. 7 is a perspective view of one embodiment of apparatus for practicing the method of my invention in the irradiation of filamentary material, which embodiment is similar to that shown in Fig. 1.

Filamentary material may be irradiated, in accordance with my invention, in much the same manner as is employed in the irradiation of flexible sheet material, hereinbefore described. Fig. 7 illustrates one embodiment of apparatus suitable for the irradiation of filamentary material, which embodiment is similar to that of Fig. 1, except that the roll 10 of flexible sheet material 9 (Fig. 1) is replaced by a spool 34 of filamentary material 35 (Fig. 7). The filamentary material 35 should be wound on the spool 34 in such a manner that a sequence of consecutive concentric layers are produced, each layer consisting of a compact helix of filamentary material 35 extending from one end of the spool 34 to the other. If each helix has $n$ turns, then the intervening product thickness between any point in the filamentary material and the electron source will be reduced by an amount equal to or less than the diameter of the filamentary material with every $n$ revolutions of the spool 34. Hence the total dose received by each such point will not be affected by the variation, with depth, of the rate at which ionizing energy is absorbed from the electron stream.

Figure 8:
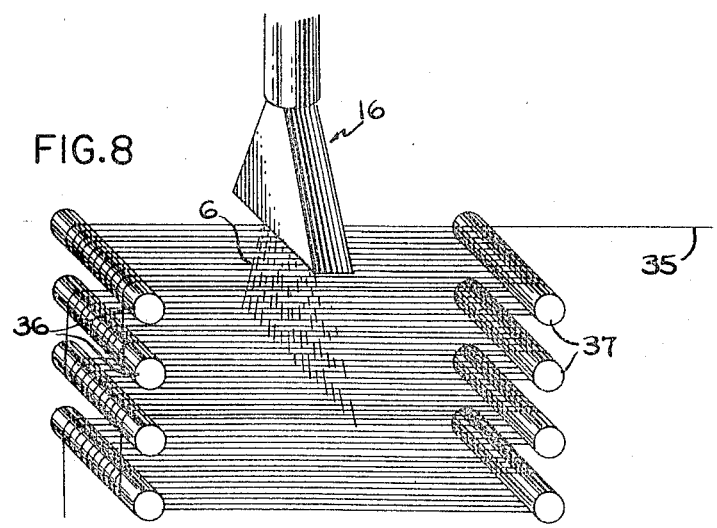
Fig. 8 is a perspective view of another embodiment of apparatus for practicing the method of my invention in the irradiation of filamentary material, which embodiment is in some respects similar to that shown in Fig. 2.

Another embodiment of apparatus for irradiating filamentary material in accordance with my invention is shown in Fig. 8, wherein a plurality of pairs of pulleys 36, 37 are arranged in vertical formation, and the filamentary material 35 is wound consecutively in compact helices about each pair of pulleys 36, 37. As is the case in the apparatus of Figs. 1, 2, 4 and 7, each point in the product of Fig. 8 travels successively in each of a sequence of layers. Moreover, in the arrangement shown in Fig. 8, each point in the product also travels across the whole cross-sectional area of the electron stream while in each layer, so that the total dose received tends to be uniform along the filamentary material even if the current distribution in the electron stream is non-uniform in space, and despite the variation, with depth, of the rate at which ionizing energy is absorbed from the electron stream.

Fluids (including liquids, gases, vapors, and fluidized solids) may be irradiated in accordance with the method of my invention by conveying the fluid product through an electron stream in a direction parallel to the direction of travel of the electrons in such stream, either towards or away from the electron source. In each of the embodiments of apparatus hereinbefore described, the product to be irradiated is conveyed through an electron stream in such a manner that at any instant the electron stream travels through a sequence of layers of the product, the motion of the product being such that every part thereof assumes in succession all positions in said sequence. In the case of a fluid product flowing through an electron stream in a direction parallel to the direction of travel of the electrons in such stream, the number of layers in the aforementioned sequence becomes, in effect, infinite. Thus, referring to the graph of Fig. 3, each point in such a fluid product moves continuously from left to right (or right to left) along said graph; and the total dose received at each such point is proportional to the area under the curve of said graph.

Figure 9:
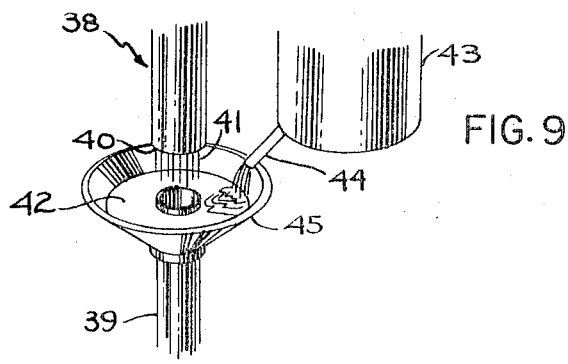
Fig. 9 is a perspective view of one embodiment of apparatus for practicing the method of my invention in the irradiation of fluid material.

An embodiment of apparatus suitable for irradiating a liquid product in this manner is shown in Fig. 9. Referring to said Fig. 9, a source of high-energy electrons is indicated at 38. A tube 39 is supported a short distance below the electron window 40 through which the beam 41 of electrons issues, and the inner diameter of said tube 39 should be slightly less than the diameter of the electron beam 41. Liquid 42 to be irradiated is discharged from a storage tank 43 through a conduit 44 into a basin 45, which is affixed to the tube below the upper extremity thereof, so that the tube 39 intrudes into the basin 45 through the bottom thereof. The liquid level in the basin 45 will rise to an equilibrium level slightly above the upper end of the tube 39, and as the liquid 42 drains out of the basin 45 through the tube 39, it is irradiated by the electron beam 41.

Having thus described the method of my invention, together with several illustrative embodiments of apparatus for practicing the same, it is to be understood that although specific terms are employed, they are used in a generic and descriptive sense and not for purposes of limitation, the scope of the invention being set forth in the following claims. In particular, the term "flexible sheet material" includes, for example, not only homogeneous material such as film, but also such material as textiles, cloth, and webs, whether woven or non-woven; the term "fluids" includes liquids, gases, vapors, fluidized solids, and fluidized suspensions of particles in liquids and gases; and the term "thin flexible material" includes both flexible sheet material and filamentary material.

I claim:

1. Apparatus for increasing uniformity of dose produced by electron irradiation in a product which is divisible into thin layers, comprising in combination: means for creating a stream of high energy electrons and means for conducting such a product through said stream in such a manner that, during the irradiation of any point in such product, the normalized product thickness intervening between such point and the electron source assumes a sequence of values, which sequence is substantially the same for all points in the product.

2. Apparatus for irradiating, with a stream of high energy electrons, material which is capable of division into incremental layers sufficiently thin so that the variation in dose across each such layer produced by a stream of electrons traveling transversely to such layer is negligible, comprising in combination: means for creating and directing a stream of high energy electrons; and means for conducting said material through said stream in such a manner that at any instant said stream travels through a sequence of incremental layers the total combined thickness of which is not less than on the order of the maximum penetration of said electron stream, the motion of said material being such that every part of said material assumes in succession substantially all positions in said sequence.

3. Apparatus for electron irradiation of continuous lengths of flexible sheet material comprising in combination: means for creating and directing a stream of high energy electrons; means for rotatably supporting at least one roll of flexible sheet material in the path of said stream so that the axis of said roll lies transversely to the direction of travel of the electrons in said stream; and means for winding or unwinding said flexible sheet material onto or from said roll during the irradiation process, whereby, during the irradiation of any point in such product, the normalized product thickness intervening between such point and the electron source assumes a sequence of values, which sequence is substantially the same for all points in the product.

4. Apparatus for electron irradiation of continuous lengths of flexible sheet material, comprising in combination: an array of pulleys arranged with their axes substantially parallel in at least one pair of columns; means for conveying a continuous length of flexible sheet material through said array in such a manner that said flexible sheet material passes alternately about consecutive pulleys in each column; means for creating a stream of high energy electrons; and means for directing said stream between said pair of columns so that said stream intersects said flexible sheet material at a plurality of areas spaced along the length of said flexible sheet material, whereby, during the irradiation of any point in such product, the normalized product thickness intervening between such point and the electron source assumes a sequence of values, which sequence is substantially the same for all points in the product.

5. Apparatus for electron irradiation of continuous lengths of flexible sheet material, comprising in combination: means for creating and directing a stream of high energy electrons; an array of pulleys arranged, with their axes substantially mutually parallel and transverse to the direction of travel of the electrons in said stream, in two columns flanking said stream of high energy electrons; and means for conveying a continuous length of flexible sheet material through said array in such a manner that said flexible sheet material passes alternately about consecutive pulleys in each column, whereby, during the irradiation of any point in such product, the normalized product thickness intervening between such point and the electron source assumes a sequence of values, which sequence is substantially the same for all points in the product.

6. Apparatus for electron irradiation of continuous lengths of flexible sheet material, comprising in combination: means for creating and directing a stream of high energy electrons; a first array of pulleys arranged, with their axes substantially mutually parallel and transverse to the direction of travel of the electrons in said stream, in two columns in V-formation flanking said stream of high energy electrons; a second array of pulleys arranged in two columns flanking said first array of pulleys; and means for conveying a continuous length of flexible sheet material through said first and second arrays of pulleys in such a manner that, during the irradiation of any point in such product, the normalized product thickness intervening between such point and the electron source assumes a sequence of values, which sequence is substantially the same for all points in the product, the pulleys of each column in said first array being closely spaced, whereby the several layers of flexible sheet material in the path of said stream are closely adjacent, and the pulleys of each column in said second array being spaced apart, whereby said flexible sheet material may be cooled between passages through said stream.

7. Apparatus for electron irradiation of a multiplicity of thin products, comprising in combination: means for supporting a stack consisting of a multiplicity of layers of such products; means for creating a stream of electrons of sufficient energy to penetrate through several layers of said stack; means for directing said stream of electrons onto one extremity of said stack; and means for repeatedly adding or removing one or more layers of small total thickness to or from said stack at said extremity thereof, whereby, during the irradiation of any point in such product, the normalized product thickness intervening between such point and the electron source assumes a sequence of values, which sequence is substantially the same for all points in the product.

8. Apparatus for electron irradiation of a multiplicity of thin products, comprising in combination: means for creating and directing a stream of high energy electrons; means for repeatedly conveying through said stream a stack consisting of a multiplicity of layers of such products; and means for repeatedly adding or removing one or more layers of small total thickness to or from said stack at that extremity of said stack upon which said electrons impinge, whereby, during the irradiation of any point in such product, the normalized product thickness intervening between such point and the electron source assumes a sequence of values, which sequence is substantially the same for all points in the product.

9. Apparatus for electron irradiation of continuous lengths of filamentary material comprising in combination: means for creating and directing a stream of high energy electrons; means for rotatably supporting at least one spool of filamentary material in the path of said stream so that the axis of said spool lies transversely to the direction of travel of the electrons in said stream; and means for winding or unwinding said filamentary material onto or from said spool during the irradiation process, whereby, during the irradiation of any point in such product, the normalized product thickness intervening between such point and the electron source assumes a sequence of values, which sequence is substantially the same for all points in the product.

10. Apparatus for electron irradiation of continuous lengths of thin flexible material, comprising in combination: means for creating and directing a stream of high energy electrons; an array of pairs of pulleys arranged, with their axes substantially mutually parallel and transverse to the direction of travel of the electrons in said stream, in two columns flanking said stream of high energy electrons; and means for conveying a continuous length of thin flexible material through said array in such a manner that every segment of the length of said thin flexible material passes consecutively through the same multiplicity of different portions of said stream, whereby, during the irradiation of any point in such product, the normalized product thickness intervening between such point and the electron source assumes a sequence of values, which sequence is substantially the same for all points in the product.

11. Apparatus for electron irradiation of fluid material, comprising in combination: means for creating and directing a stream of high energy electrons and means for conveying such fluid material through said stream in a direction substantially parallel to the direction of travel of the electrons in said stream, whereby, during the irradiation of any point in such product, the normalized product thickness intervening between such point and the electron source assumes a sequence of values, which sequence is substantially the same for all points in the product.

References Cited in the file of this patent

UNITED STATES PATENTS

| | | |
|---|---|---|
| 2,001,555 | Trebler | May 14, 1935 |
| 2,602,751 | Robinson | July 8, 1952 |
| 2,668,133 | Brophy | Feb. 2, 1954 |
| 2,680,814 | Robinson | June 8, 1954 |
| 2,722,620 | Gale | Nov. 1, 1955 |
| 2,737,593 | Robinson | Mar. 6, 1956 |

Notice of Adverse Decision in Interference

In Interference No. 90,954 involving Patent No. 2,858,442, D. R. Dewey II, APPARATUS FOR INCREASING THE UNIFORMITY OF DOSE DISTRIBUTION PRODUCED BY ELECTRON IRRADIATION, final judgment adverse to the patentee was rendered July 31, 1963, as to claims 1, 2 and 3.

[*Official Gazette September 28, 1965.*]

Disclaimer 2,858,442.—*Davis R. Dewey, II*, Lincoln, Mass. APPARATUS FOR INCREASING THE UNIFORMITY OF DOSE DISTRIBUTION PRODUCED BY ELECTRON IRRADIATION. Patent dated Oct. 28, 1958. Disclaimer filed Nov. 15, 1966, by the assignee, *Electronized Chemicals Corporation*.

Hereby enters this disclaimer as to claims 1, 2 and 3 of said patent.
[*Official Gazette December 27, 1966.*]